May 11, 1948.  S. J. BECKER  2,441,343
PHOTO-ELECTRIC RING GAUGE
Filed July 7, 1944

Inventor:
Sylvan J. Becker
By: Edward C. Fitzpaugh
Atty.

Patented May 11, 1948

2,441,343

UNITED STATES PATENT OFFICE 2,441,343

PHOTOELECTRIC RING GAUGE

Sylvan J. Becker, Maywood, Ill., assignor to Borg-Warner Corporation, Chicago, Ill., a corporation of Illinois Application July 7, 1944, Serial No. 543,829

7 Claims. (Cl. 88—14)

The present invention relates to an arrangement for testing or checking a ring-shaped member to ascertain any imperfections that may exist in the work engaging edges of such ring and for readily determining the accuracy or exactness of conformity of the periphery of the ring with respect to a test gauge. The structure contemplated herein is especially adapted for use in testing piston rings.

It is one of the principal objects of this invention to simplify the construction of a ring gauge such as contemplated herein, and to improve the efficiency, operation, and dependability of such ring gauge.

Another of the principal objects of this invention is to provide an indicator such as a visual scale having a movable pointer that is influenced by the quantity of light rays that may pass through any narrow space or slit between the gauge and the periphery of the ring. The light rays are of a concentrated character and are effective upon a light-sensitive element such as a photo-electric cell and the current variations that are thus produced in the photo-electric cell by variations in light density are transmitted by means of an amplifier circuit to the indicator or pointer and are thus visually shown upon the dial or scale where they are noted by the operator.

A further object of this invention resides in providing a dependable means for receiving and accurately positioning or seating the ring with respect to a ring holder or gauging member. In this connection means are provided for retracting or withdrawing such means prior to making the test that will reveal the trueness or roundness of the ring.

Additional objects, aims, and advantages of the invention contemplated herein will be apparent to persons skilled in the art after the construction and operation of the ring gauge are understood from the within description.

It is preferred to accomplish the numerous objects of this invention and to practice the same in substantially the manner hereinafter fully described and as more particularly pointed out in the appended claims, reference being made to the accompanying drawings that form a part hereof and wherein:

The drawings are to be understood as being more or less of a schematic character for the purpose of disclosing a typical or preferred form of the improvements contemplated herein, and in these drawings like reference characters identify the same parts in the different views.

Figure 1:
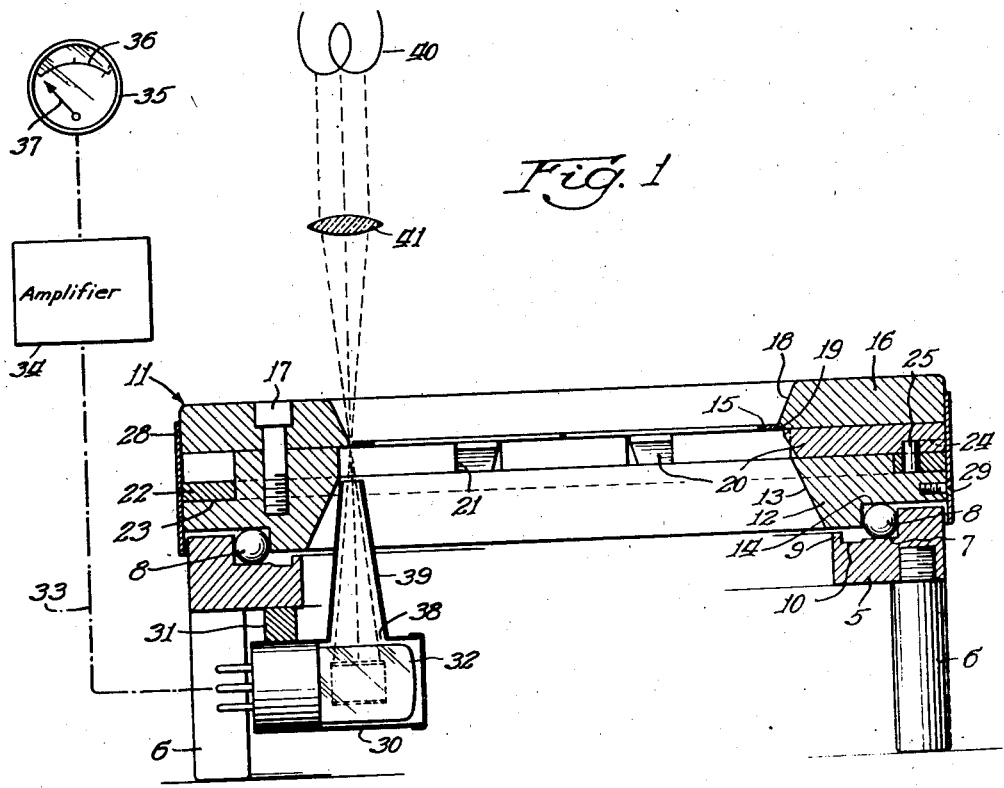
Fig. 1 is a transverse vertical section taken axially through a structure embodying the instrumentalities of the ring gauge contemplated herein, the view being taken on the plane of line 1—1 on Fig. 2.

The assembly shown in Fig. 1 comprises a supporting member or base 5 of a ring-shape that is mounted upon legs 6 and has a shouldered portion in its top surface that provides a race 7 for a plurality of anti-friction members, preferably balls 8. The inner margin of base member 5 has an upstanding lip 9 and between this lip and the race 7 there is a shallow channel 10 that serves as a drain to collect extraneous matter and lubricant that may be shed from the race 7. An annular carrier assembly, designated as a whole as 11, is positioned above base member 5 and comprises a ring-shaped body 12 having an undercut or chamfered inner edge 13. The bottom face of the carrier body 12, that is positioned in spaced confronting relation to the base 5, has a shouldered portion which provides the upper race 14 for the anti-friction members 8 that support the carrier 11 for free arcuate or rotational movement independent of the support 5.

The gauge member, into which the ring 15 to be tested is inserted, comprises an annulus 16 having an internal diameter that is less than the inner diameter of the body member 12 to which the annulus is secured by bolts 17. The inner edge 18 of this annulus 16 has a conical shape tapering inwardly from its top downward to near its bottom where said inner edge comprises a cylindrical gauge surface 19 that has been accurately machined to the exact contour and circumferential shape required of the tested ring 15. The diameter of gauge surface 19 is less than the normal diameter of the ring 15 that is compressed to its working dimensions to be forced into the gauge 19 where it is held by frictional contact. The tapered or conical surface 18 performs the function of a guide to facilitate the insertion of the ring 15 into the gauge portion 19 of the annulus.

Means are provided for accurately seating the ring when it has been forced across the guide surface 18 and into the gauge 19, such means comprising a plurality of elongated retractable blocks 20 that are slidably mounted for longitudinal reciprocal movement in radially disposed slots 21 formed in the upper surface of the carrier body 12. These blocks in projected positions protrude inward past the cylindrical gauge surface 19 to provide seats or stops against which the ring 15 will be pressed by the operator who has forced said ring down the tapered guide surface 18 of the gauge annulus 16. During the performance of this stage of the operation the ring 15, which is of the split type, will have been compressed and its tendency to expand will press its outer edge against the gauge surface 19 with sufficient friction to suspend the ring 15 in the gauge annulus and permit the withdrawal of the seat blocks 20 to their retracted positions that are shown in Fig. 1.

Figure 2:
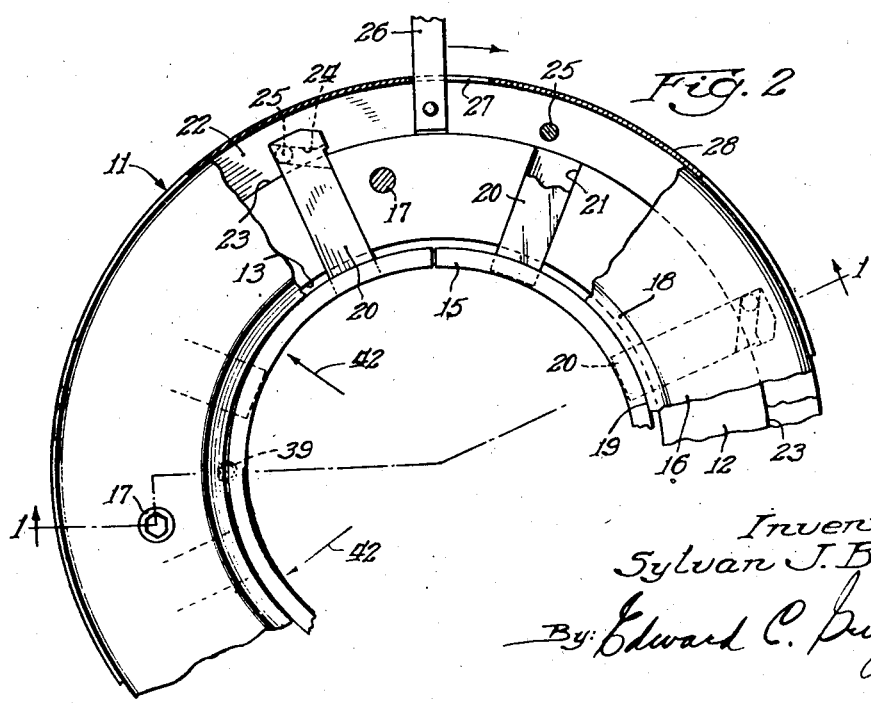
Fig. 2 is a fragmental plan of the assembly shown in Fig. 1, with portions broken away for clearness.

The reciprocable movement of the seat blocks 20 is effected by cam means that operate said blocks to retract them away from the ring 15 or to project them into positions to permit seating of said ring. These means comprise a circular actuator 22 that has limited arcuate movement in a guide channel 23 formed in the upper outer marginal portion of the carrier body 12 and having communication with the radial slots 21 that guide the seat blocks 20. The adjacent ends of said seat blocks 20 extend over the top of the actuator 22 and are provided with oblique cam grooves 24 in their confronting under surfaces that receive upstanding projections or pins 25 on the proximate face of the actuator 22. Thus an arcuate movement of the actuator in the direction of the arrow (Fig. 2) will move the pins 25 in cam grooves 24 to retract the seat blocks and reverse arcuate movement of the actuator will project the ends of the seat blocks 20 beyond gauge surface 19 in a plane below the same. A handle 26 projects from the actuator through a slot 27 in a band or skirt 28 that is secured by screws 29 to the body member 12 of the carrier, the ends of said slot 27 defining the limits of arcuate movement of the actuator 22.

For the purpose of indicating the true roundness of the ring 15, light-sensitive electrical means are employed in conjunction with suitable optical means for concentrating light rays upon the juncture between the gauge surface 19 and the proximate outer edge of the ring 15 after the latter has been mounted in the gauge and the seat blocks 20 have been moved to their retracted positions. A tubular housing 30 is supported by a bracket 31 upon the under side of the support or bed 5, and within said housing there is a photo-electric cell 32. A conventional amplifying circuit 33, leading from the photo-electric cell 32 through an amplifier 34, is employed to amplify the current changes that are produced in the photo-electric cell due to varying light densities of the rays that pass the gauge and ring and deliver the same to a suitable indicator 35 to be visually noted by the operator. This indicator comprises a graduated scale 36 and an electro-responsive pointer 37 that is activated by the amplifier current in the circuit 33. The amplifier 34 may be a highly sensitive two-stage type producing a relatively large plate current when a comparatively small amount of radiant energy impinges upon the cathode of the photo-electric cell 32.

The housing 30 has a circular light aperture 38 in the upper segment of its cylindrical wall, the axis of said aperture being aligned with the juncture between the gauge surface 19 and the proximate outer edge of the ring, and said aperture is surrounded by a light transmitting tube 39 having a tapered or funnel-shape that axially aligns with said light aperture 38 to confine the light rays and exclude extraneous light. The small upper end of light confining tube 39 is in a horizontal plane slightly below the plane of the bottom surfaces of the seat blocks 20 to prevent interference therewith. Above the gauge annulus 16 a suitable light source or lamp 40 is mounted in a fixed position, preferably in axial alignment with the light tube 39 and photo-electric cell 32, and interposed between said lamp 40 and the gauge annulus 16 there is a light-condensing optical element or lens 41. The focal point of this lens 41 is between the outer edge of the ring 15 and the gauge surface 19. The light rays from lamp 40 are converged toward and are concentrated at this critical point and these rays will pass through any gap between the ring and the gauge and then diverge upon the light-sensitive element of the photo-electric cell 32. The permissible tolerance is shown upon the scale 36 for guiding the operator and any deviation of the pointer beyond this limit will be immediately noted. Thus, should the ring under test have an outer edge that is not a true circle, there will be a gap, such as shown between the radial arrows 42 on Fig. 2, and the increased amount of light rays passing therethrough will increase the activity of the photo-electric cell 32 to which the pointer 37 will respond.

After the ring 15 has been inserted into the gauge the handle 26 is moved in a direction to operate the cam devices and effect the retraction of the seat blocks 20 beyond the axis of the optical and light-sensitive devices, and thereafter the carrier assembly 11 is rotated upon its axis that is parallel to said devices. This rotation of the carrier assembly 11 is continued until the entire perimeter of the ring 15 has passed between the light source and the photo-electric cell and the current changes that have been produced in the cell are noted on the indicator 35 by the operator who will discard the rings that have been shown to be imperfect in roundness.

While this invention has been described in detail, in its present preferred form or embodiment, it will be apparent to persons skilled in the art, after understanding the improvements, that various changes and modifications may be made therein without departing from the spirit or scope thereof.

I claim:

1. An apparatus for inspecting a circular object such as a piston ring comprising a support, means for projecting a beam of light, a gauge mounted for rotation on said support about an axis parallel with the axis of said beam, said gauge having a central object-receiving opening of predetermined diameter and shape and adapted to receive the object to be inspected with its outer wall engaging the wall of the opening so that light may pass therebetween wherever the walls are not in contact, the beam projecting means and the contacting walls of the opening and the object being aligned with each other and a light sensitive device positioned to receive light passing between said walls of the opening and the object, and indicating means controlled by said light sensitive device.

2. A ring gauge comprising a support; a ring supporting member adapted for rotative movement on said support and having an opening, the wall of said opening having a continuous unbroken gauge surface against which the ring is frictionally retained solely by the tendency of the ring to expand; means for projecting a light beam towards said gauge surface; said ring supporting member being rotatable on an axis parallel with said light beam; and means for indicating non-contacting relationship between the ring and said gauge surface, said means comprising a light-sensitive electrical device positioned to receive light rays passing between non-contacting portions of said gauge surface and the ring; and an electro-responsive device in the circuit with said light-sensitive device for indicating current changes produced in said light-sensitive device.

3. A ring gauge comprising a stationary support; means for projecting a light beam; an annulus rotatable on said support on an axis parallel with the axis of said light beam; said annulus having a central unbroken annular gauge surface against which the ring in a constricted state is frictionally supported; retracting seats on said annulus for limiting insertion of the ring in said gauge, said annulus having slots in which said seats are movably mounted; cam means on said annulus for moving said seats in said slots into and out of co-active relation with the ring; and light sensitive electro-responsive devices normally interrupted by said gauge and ring for receiving and indicating light rays passing between the gauge and the ring.

4. A ring gauge comprising a stationary support; means for projecting a light beam towards said support; an annulus rotatable on said support on an axis parallel with the axis of said light beam; said annulus having a central unbroken annular gauge surface against which the ring in a constricted state is frictionally supported; retractable seats on said annulus for limiting insertion of the ring into said gauge, said seats being adapted for reciprocal movement in radial slots for said annulus; a ring-shaped member having limited arcuate movement on said annulus; cam means operatively connecting said ring-shaped member to said seats, said ring-shaped member being arranged for arcuate movement in one direction to project said seats into positions to receive the ring, and for arcuate movement in a reverse direction to retract said seats out of engagement with the ring; and light-sensitive electro-responsive devices normally interrupted by said gauge and ring for receiving and indicating light rays passing between the gauge and the ring when said seats are in retracted positions.

5. An arrangement for testing the conformity of the outer periphery of a split piston ring with the surrounding surface of standard gauge, said arrangement including means defining an annular standard gauge having an unbroken inner pipherial gauge surface adapted to receive the constricted split piston ring in contact therewith; means for projecting a beam of light towards said gauge surface and ring, said gauge being arranged with its axis parallel with the axis of said light beam; photoelectric cell means responsive to light rays passing between said ring and gauge surface; and means for effecting relative rotative movement between said photoelectric cell and light beam and said ring and gauge, whereby uninterrupted light rays passing between said gauge surface and ring are indicated throughout the circumference of the ring.

6. An apparatus for inspecting a circular object such as a piston ring, comprising a support; means for projecting a beam of light towards one side of said support; a gauge rotatable around an axis parallel to the axis of said beam, said gauge having a central object-receiving opening of predetermined diameter and shape and being adapted to receive the object to be inspected with the outer wall of the object engaging the wall of the opening and frictionally supported therein, so that light may pass therebetween wherever the walls are not in contact, the beam-projecting means and the contacting walls of the opening and the object being aligned with each other; a light-sensitive device positioned to receive rays of the light beam passing between said walls of the opening and the object; a series of rotatable elements rotatably mounted on said support and bearing against a side and against peripheral portions of said gauge and locating the axis of rotation of the gauge; and indicating means controlled by said light-sensitive device.

7. An apparatus for inspecting a circular object such as a piston ring, comprising a support; means for projecting a beam of light in a downward direction towards said support; a gauge rotatable around an axis parallel with the axis of said beam, said gauge having a central object receiving opening of predetermined diameter and shape and being adapted to receive the object with the outer wall of the object engaging the wall of the opening and frictionally supported therein, so that light may pass downwardly therebetween wherever the walls are not in contact, the beam-projecting means and the contacting walls of the opening and the object being aligned with each other; a light-sensitive device positioned below said gauge to receive rays of the light beam passing between said walls of the opening and the object; a series of anti-friction balls rotatably supporting said gauge on said support and locating the axis of rotation of the gauge; means defining seats on said gauge projecting into said opening for positioning the object, said seats being retractable prior to inspecting the object; and indicating means controlled by said light-sensitive device.

SYLVAN J. BECKER.

REFERENCES CITED

The following references are of record in the file of this patent:

UNITED STATES PATENTS

| Number | Name | Date |
| --- | --- | --- |
| 1,332,571 | Ray | Mar. 2, 1920 |
| 1,455,864 | Busick | May 22, 1923 |
| 1,482,392 | Frank | Feb. 5, 1924 |
| 1,576,346 | Mendell | Mar. 9, 1926 |
| 1,630,690 | Bosle et al. | May 31, 1927 |
| 1,963,128 | Geister | June 19, 1934 |
| 2,085,671 | Powers | June 29, 1937 |